(12) United States Patent
Sasaki et al.

(10) Patent No.: US 6,478,480 B1
(45) Date of Patent: Nov. 12, 2002

(54) OPTICAL PARTS ASSEMBLING METHOD AND THE OPTICAL PARTS

(75) Inventors: Takashi Sasaki; Shinji Ishikawa, both of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/148,069

(22) Filed: Sep. 4, 1998

(30) Foreign Application Priority Data

Sep. 4, 1997 (JP) .............................. 9-239176

(51) Int. Cl.$^7$ ................................ G02B 6/36
(52) U.S. Cl. ....................... 385/94; 385/92; 219/121.64
(58) Field of Search ................... 385/88–94; 219/121.6, 219/121.63, 121.64; 257/99, 100

(56) References Cited

U.S. PATENT DOCUMENTS

| | | | | |
|---|---|---|---|---|
| 5,386,488 A | * | 1/1995 | Oikawa | 385/92 |
| 5,393,956 A | | 2/1995 | Guth et al. | |
| 5,604,361 A | * | 2/1997 | Isaksson | 257/99 |
| 6,053,641 A | * | 4/2000 | Chun | 385/93 |

FOREIGN PATENT DOCUMENTS

| | | |
|---|---|---|
| EP | 0 587 895 | 3/1994 |
| JP | 7-318763 | * 12/1995 |

OTHER PUBLICATIONS

Patent Abstracts of Japan, vol. 017, No. 474 (P–1602), Aug. 27, 1993 & JP 05 113524 A (Hitachi Cable LTD), May 7, 1993.
Patent Abstracts of Japan, vol. 196, No. 4, Apr. 30, 1996 & JP 07 318763 A (Oki Electric Ind Co LTD3), Dec. 8, 1995.
Patent Abstracts of Japan, vol. 1997, No. 07, Jul. 31, 1997 & JP 09 080266 A (Fujitsu LTD), Mar. 28, 1997.

* cited by examiner

Primary Examiner—Hemang Sanghavi
(74) Attorney, Agent, or Firm—McDermott, Will & Emery

(57) ABSTRACT

An optical component assembling method, in which a first metal housing (10) holding a first optical element and a second metal housing (20) holding a second optical element are made to abut against each other on joint surfaces (10b, 20b) thereof, and irradiated with a laser beam (31) so as to be fixedly welded with each other, characterized in that one of the metal housings overhangs from the other of the metal housings, and the laser beam is radiated in an incident direction θ inclined to the overhanging metal housing side so as to perform spot-welding (30) on outer circumferences of the joint surfaces where the metal housings abut against each other, whereby the decrease of light-intensity at the time of assembly is suppressed to be extremely low.

6 Claims, 6 Drawing Sheets

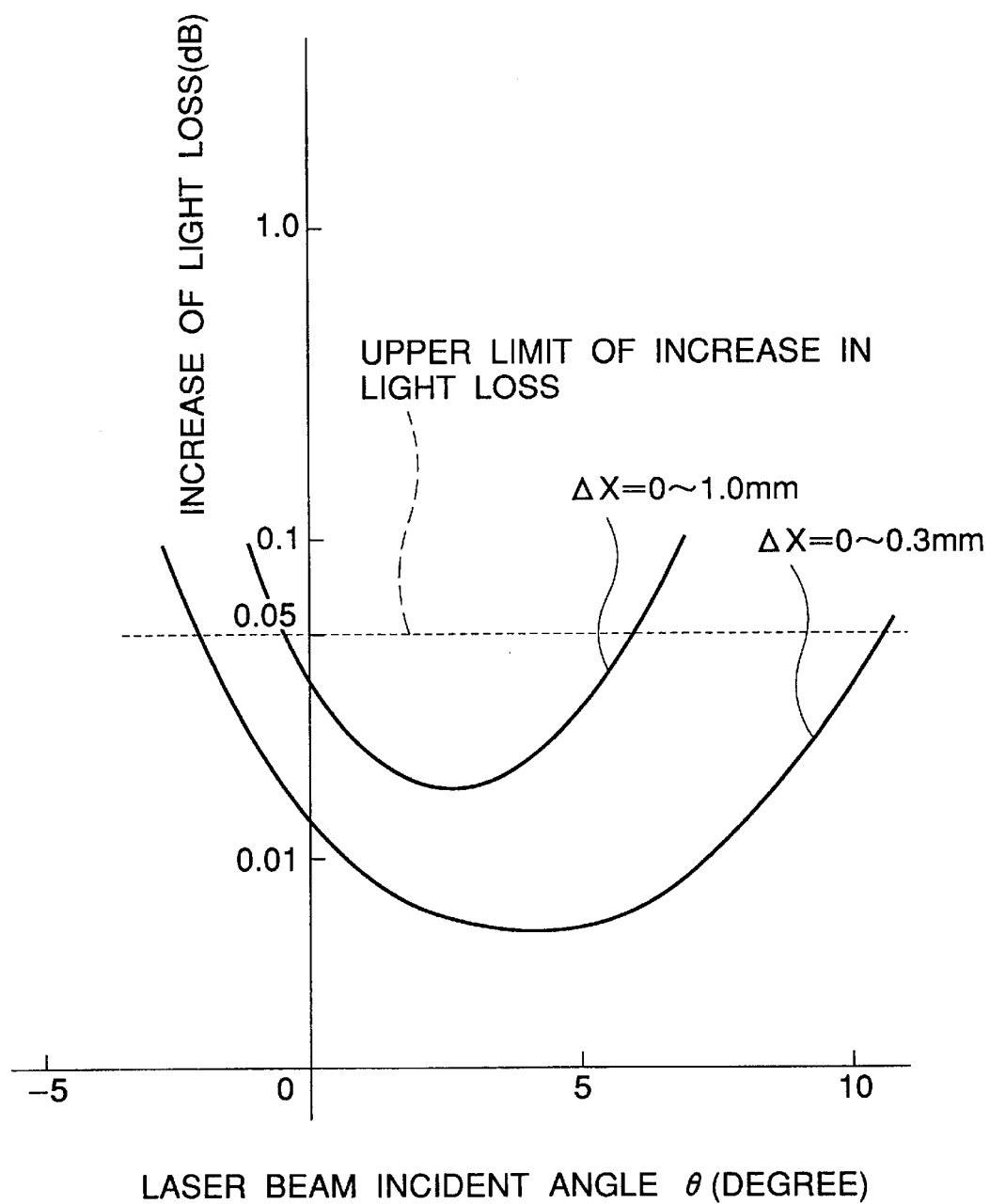

US 6,478,480 B1

OPTICAL PARTS ASSEMBLING METHOD AND THE OPTICAL PARTS

BACKGROUND OF THE INVENTION

1. Field of the Invention

The present invention relates to a method of assembling optical components, such as LD modules and in-line isolators, comprising a plurality of metal housings holding optical elements, and relates to such optical components per se.

2. Description of the Related Art

Conventionally, to connect fine optical elements optically, these optical elements are stored and held in metal housings first, and the mutual positional relationship between these metal housings is adjusted by adjusting the optical axes so that an optimum position where decrease of light-intensity is minimized is determined. After that, the metal housings are bonded by spot-welding.

For example, according to Japanese Patent Unexamined Publication No. Hei-7-318763, as shown in FIG. 6, a first metal housing 5 holding an optical fiber 7, which is one optical element, through an optical fiber holder 6, and a second metal housing 1 including an optical element 3, which is the other optical element, are spot-welded by welding spots 10 on the outer circumferences of the joint surfaces where the metal housings abut against each other.

In addition, as understood from FIG. 6, a member which is located in a lower position is made to more project laterally than a member located in an upper position to thereby form a recess portion, so that welding can be formed easily because of the existence of the recess portion and the surface tension of welding metal.

Although the direction of radiation of a laser beam is not disclosed in this publication, conventionally, a laser beam 31 is radiated on the recess portion directly.

However, in the conventional bonding method for making optical components, there is a problem that thermal deformation appears in the metal housings in the process to weld the metal housings after the optimum position between the metal housings is determined by adjusting the optical axes to minimize the decrease of light-intensity, and consequently the position determined by the adjustment of the optical axes before welding may be displaced to thereby decrease light-intensity.

In order to solve the problem of displacement between the optical fiber holder 6 holding the optical fiber 7 and the first metal housing 5, the above-mentioned Japanese Patent Unexamined Publication No. Hei-7-318763 makes a proposal in which, instead of the first metal housing 5, a special spacer is inserted between the optical fiber holder 6 and the second metal housing 1 so as to weld the respective abutting surfaces with each other by spot-welding.

However, the problem of positional displacement between this special spacer and the second metal housing 1 caused by thermal unevenness of the welding portions was not solved even by this proposal.

Therefore, the present inventors investigated the cause of the above-mentioned thermal deformation in spot-welding and the positional displacement due to the thermal deformation. On the basis of the result of this investigation, the present inventors disclose an optical compoenent assembling method and the optical components per se in which decrease of light-intensity when metal housings are welded can be suppressed within an allowable range at low costs, and without requiring any special parts.

An experimental examination was made about the cause of the thermal deformation caused by welding the above-mentioned metal housings by the conventional welding method, and the positional displacement between the metal housings.

First, investigation was made about the thermal deformation in the case where the respective surfaces to be bonded of two cylindrical metal housings 10 and 20, as shown in FIG. 3A, the outer diameters of which are different from each other, were made to abut against each other while their centers were made coincident with each other so that the side of the first metal housing 10 overhung from the side of the second metal housing 20 with its overhanging quantity ΔX equal all over the circumference, and spot-welding was performed in positions which were on the outer circumferences of the joint surfaces where the metal housings abut against each other, and which were rotationally symmetrical with respect to the center of the joint surfaces.

The welding positions herein used means positions 30a, as shown in FIG. 1, which are on the outer circumferences of the joint surfaces where the respective metal housings 10 and 20 abut against each other, and which are rotationally symmetrical with respect to the center of the joint surfaces, and which are on the bottom of V-shaped recess portions formed by a skirt portion of the overhanging metal housing 10 and a side 20a near the joint surface of the other metal housing 20.

The present inventors have found that, though thermal deformation occurs in the spot-welded metal housings in the direction parallel to the direction (hereinafter referred to as "axial direction") of virtual central axis (hereinafter simply referred to as "central axis") perpendicularly crossing the joint surfaces where the metal housings abut against each other at the center position of the joint surfaces so as to form a fine space, enough deformation to tilt the central axes of the spot-welded metal housings does not occur, as shown in FIG. 3A.

This is because the rate of heat supply by radiation of a laser beam and the rate of cooling are equal between the respective welding positions in the left and right circles A and B of FIG. 3A. That is, when a laser beam is radiated onto the welding positions under the same conditions, first, metal at the irradiated positions is heated and melted, and heat is diffused in the inside of the metal housings so that the metal housings expand thermally.

Therefore, the melted portions at the respective welding positions are subjected to tensile stress in the axial direction of the metal housings so as to be extended due to the thermal expansion. Next, because the cooling starts from the outer-circumferential portions of the metal housings including these extended melted portions, the melted portions are solidified while being extended in the axial direction.

In this case, the external surface areas around the welding positions within the circles A and B of FIG. 3A were equal and the cooling rates of the two portions were also equal. Accordingly, it is considered that the expansion and shrinkage of the left welding position were equal to those of the right welding position and that, through deformation parallel to the axial direction was caused, deformation enough to tilt the central axis was not caused. Generally, decrease of light-intensity is so small as may be ignored in the case of deformation in the direction parallel to the central axis, while it is comparatively large in the case of deformation in the direction to tilt the central axis.

In addition, because the inside of the metal housings is cooled more slowly than the outside, cooling advances in the inside even after the welding portions facing the outside are solidified. As a result, a fine space is produced between the bonded surfaces of the metal housings 10 and 20.

Next, because the central axes of the respective metal housings determined by the optical axes adjustment are generally shifted, that is, the overhanging quantity ΔX of the overhanging metal housing is often not uniform in every position in the outer circumferences of the joint surfaces, investigation was made about thermal deformation in the case where the metal housings were welded in this state.

In this case, it is considered that, as shown in FIG. 3B, thermal deformation in the direction to tilt the central axis is produced by welding because of unevenness in cooling rate among the welding positions when the overhanging quantity ΔX of the side of one metal housing 10 relative to the side of the other metal housing 20 is different among the positions of the joint surfaces where the metal housings abut against each other.

In the area around the welding position within the circle A in the left of FIG. 3B, the overhanging quantity ΔX of the metal housing 10 is comparatively small in comparison with the area around the welding position within the circle B in the right of FIG. 3B, so that the ratio of the outside surface area per volume in which metal in the welding position faces the outside is comparatively small. Accordingly, it is difficult for heat to escape and therefore the rising of temperature of the metal housing and the thermal deformation become relatively large.

On the other hand, in the area around the welding position within the circle B in the right of FIG. 3B, the overhanging quantity ΔX is comparatively large, and the ratio of the outside surface area per volume of metal in the welding position is comparatively large. Accordingly, heat is apt to escape so that the rising of temperature of the metal housing and the thermal deformation become relatively small.

As a result, the inventors found the quantity of thermal deformation in the welding position within the circle A in the left of FIG. 3B becomes larger than the quantity of thermal deformation in the welding position within the circle B in the right. Accordingly, welding causes thermal deformation in the direction to tilt the central axis, that is, positional displacement in the direction to rotate the optical axis to the right.

If the metal housings are pressed by a force against the thermal expansion from above and under so as to entirely suppress the thermal expansion in the axial direction at the time of welding, there is a possibility to exclude such thermal deformation itself. However, buckling is produced in the metal housings to thereby injure optical elements held in the inside of the metal housings. Accordingly, this method cannot be adopted.

Though a large effect cannot be expected, it can be considered that, if the thermal expansion is suppressed by pressing the metal housings within an allowable range, the thermal deformation and the decrease of light-intensity due to the thermal deformation can be suppressed so much.

SUMMARY OF THE INVENTION

The present invention has been made to solve the above problems, and therefore an object of the present invention is to provide an optical component assembling method in which even if the central axes of respective metal housings determined by the optical axes adjustment do not coincide with each other, thermal deformation in the rotational direction caused by welding thereafter can be suppressed, so that the decrease of light-intensity is extremely small and provides such optical components.

Because the central axes of the metal housings which are in the mutual optimum positions determined by the optical axes adjustment are often incoincident with each other, the present invention is suitable for the case where optical components are mass-produced and has a great practical significance.

In order to solve the above problems, according to the present invention, provided is an optical component assembling method, in which a first metal housing holding a first optical element and a second metal housing holding a second optical element are made to abut against each other on joint surfaces thereof, and irradiated with a laser beam so as to be fixedly welded with each other, characterized in that a side of one of the metal housings is made to overhang from a side of the other of the metal housings, and the laser beam is radiated in an incident direction inclined to the overhanging metal housing side so as to perform spot-welding on outer circumferences of the joint surfaces where the metal housings abut against each other.

That is, on the basis of the above-mentioned investigation and consideration about thermal deformation and positional displacement, the present inventor obtained a view that the decrease of light-intensity after welding can be suppressed even when the central axes of the respective metal housings adjusted by the optical axes adjustment are shifted perpendicularly to each other, if heating and cooling conditions are made as equal as possible among respective welding positions, and the heating and cooling rates are made moderate. Through trial and error repeated on the basis of this view, the present inventor has completed this invention.

BRIEF DESCRIPTION OF THE DRAWINGS

FIG. 5 is a view illustrating the relationship between the radiation direction of a laser beam and the decrease of light-intensity after welding.

DETAILED DESCRIPTION OF THE PREFERRED EMBODIMENTS

Figure 1:
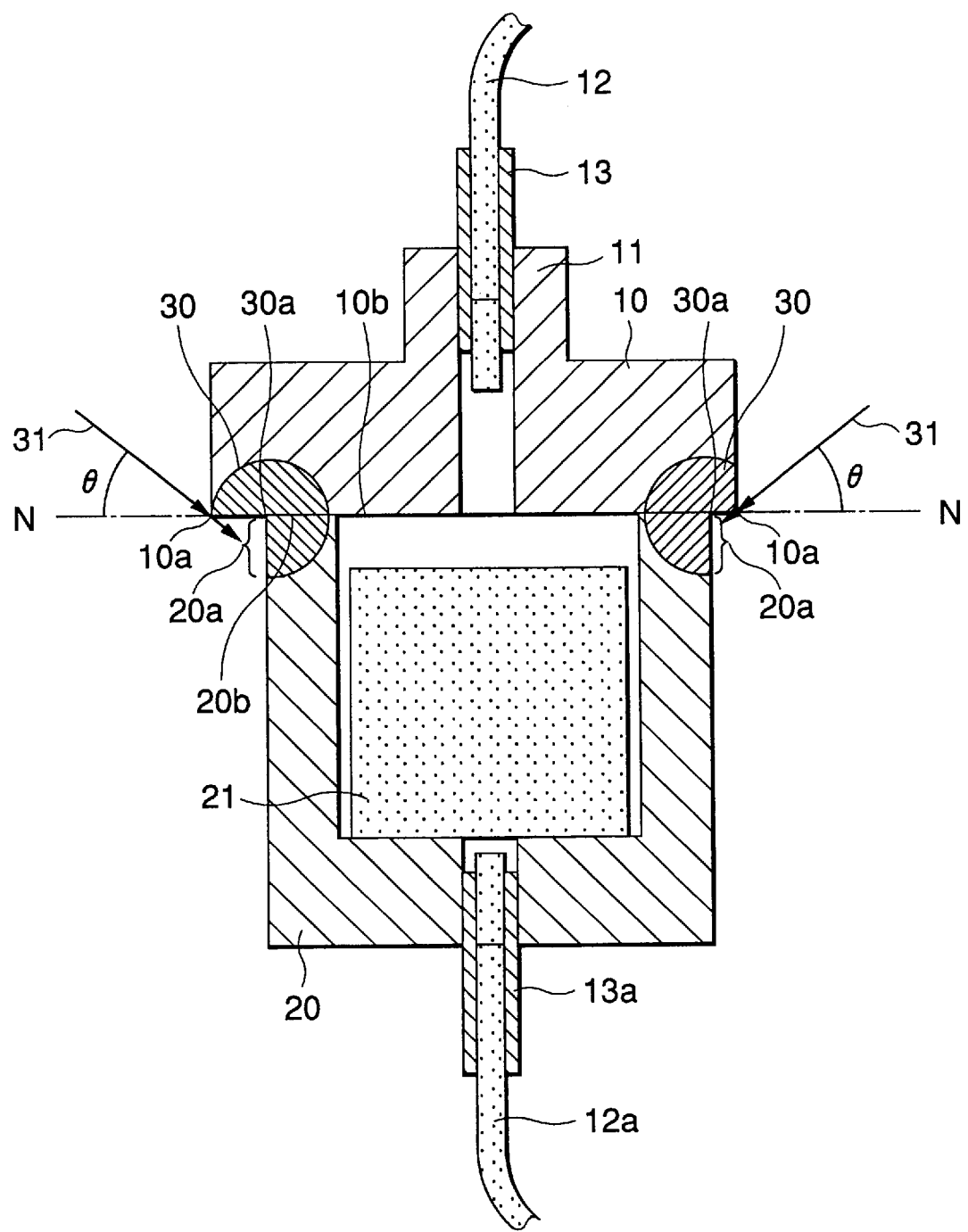
FIG. 1 is a longitudinal sectional view illustrating an optical component assembling method and the optical components according to the present invention.

The present inventor repeated welding tests on metal housings 10 and 20 having optically optimum positions where their central axes are shifted from each other as shown in FIG. 1 in such a manner that a laser beam 31 was radiated onto the outer circumferences of the joint surfaces of the respective metal housings 10 and 20 from various directions. Consequently, against common sense, the inventor found that when the laser beam 31 was radiated in the incidental direction inclined to the overhanging metal housing 10 side, thermal deformation became equal among the respective welding positions in the outer circumferences of the joint surfaces where the metal housings abutted against each other, so that the displacement of the optical axes of the metal housings and the decrease of light-intensity caused thereby could be suppressed. This invention was completed on the basis of this fact.

That is, the present invention is featured in that a forward end 10a of a skirt portion of the overhanging metal housing 10 near the welding position 30a and a side 20a of the other metal housing 20 near the joint surface are radiated and heated by a laser beam at the same time from a direction in which an incident angle θ of the laser beam is inclined toward the metal housing 10 overhanging in the direction N (hereinafter, for convenience of description, an incident angle θ in the direction inclined toward a metal housing overhanging in the direction N perpendicular to the side of the metal housing is assumed to be positive (>0), while the incident angle θ in the direction inclined toward the other metal housing is assumed to be negative (<0)), and as a resultant effect, members near the portions around the respective welding positions 30a are heated comparatively uniformly, so that thermal deformation in the rotational direction and the decrease of light-intensity caused thereby at the time of welding can be suppressed to be within an allowable range.

In other words, the present invention is intended to solve the foregoing problems not by making the welding positions 30a of the metal housings illustrated in FIG. 1 be irradiated directly with a laser beam, but by making the forward end 10a of the skirt portion of the first metal housing 10 and the side 20a of the second metal housing 20 near the welding positions 30a be irradiated and heated at the same time with a laser beam.

Now, preferred embodiments of the present invention will be described in more detail with reference to FIGS. 1 to 5. The same parts are referenced correspondingly, and the duplicated description thereof will be omitted.

(Embodiment 1)

An Embodiment 1 is the case where, as shown in FIG. 1, a columnar metal housing 10 holding an optical fiber collimator 12 as a first optical element, in which graded-index optical fiber chip lenses are bonded at the front end of a single-mode optical fiber, and a columnar metal housing 20 holding an optical isolator 21 and an optical fiber collimator 12a linked with the optical isolator as a second optical element, are made to abut against each other on respective joint surfaces 10b and 20b, and the outer circumferences of the joint surfaces are spot-welded by a laser beam 31. In this case, the outer diameter of the first metal housing 10 is larger than that of the second metal housing 20, and the height of the former is smaller than that of the latter.

The first metal housing 10 has a through hole along its central axis. The through hole acts as a light path. A cylindrical holder 11 is formed on the first metal housing 10 for holding the optical fiber collimator 12 as the first optical element through a protective tube 13. The outer diameter of a collar portion of the metal housing 10 is within a range of from 3 mm to 6 mm, and the height is within a range of from 0.5 mm to 2.0 mm.

The second metal housing 20 holds the optical isolator 21 in its inside space. The optical isolator 21 is a chief element of the second optical element. In addition, the second metal housing 20 has a through hole along its central axis. The through hole acts as a light path. The optical fiber collimator 12a linked with the optical isolator 21 as a portion of the second optical element is inserted into the through hole through a protective tube 13. The outer diameter of the metal housing 20 is within a range of from 3 mm to 6 mm, and the height is within a range of from 5 mm to 15 mm.

The metal housings 10 and 20 holding the optical elements 12 and 12a, respectively, are made to abut against each other on the bonded surfaces 10b and 20b, and the optically optimum positions where the decrease of light-intensity is minimum value are determined by adjusting their optical axes. The central axes of the respective metal housings after the adjustment of the optical axes are generally displaced.

Figure 4A:
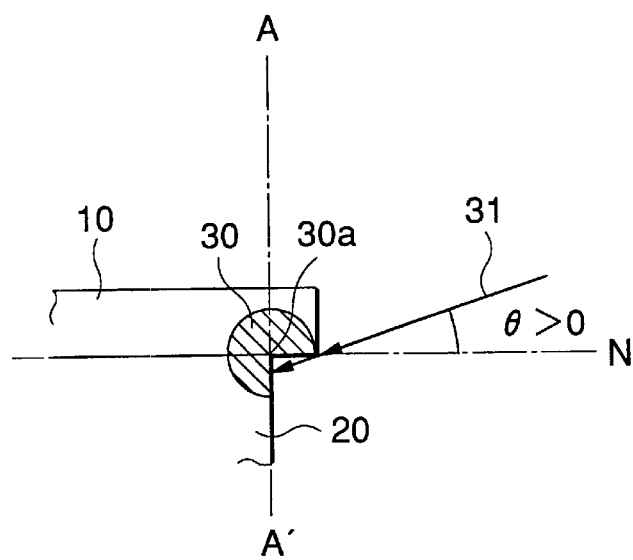
FIGS. 4A to 4D are side views illustrating the relationship between the radiation direction of a laser beam and the shape of a welding spot.

As shown in FIG. 4A, a laser beam 31 is radiated to a skirt portion 10a of the metal housing 10 and a side 20a of the metal housing 20 near welding positions 30a on the outer circumferences of the joint surfaces where the metal housings abut against each other. The radiation is performed upon the respective welding positions from a direction inclined toward the overhanging metal housing 10 at an incident angle θ (θ>0), at the same time and under the same conditions. In such a manner, the metal housings are spot-welded, so that the optical components are assembled with each other.

For example, as shown in FIG. 5, in the samples in which the overhanging quantity ΔX in each position on the outer circumference is in a range of from 0 mm to 0.3 mm, that is, the metal housing 10 partially overhangs from the metal housing 20, and the overhanging quantity ΔX is distributed within a range of from 0 mm at a minimum position to 0.3 mm at a maximum position, the decrease of light-intensity in completed optical components can be made not more than 0.05 dB, which is an upper allowable limit, when spot-welding is performed by radiating a laser beam at the incident angle θ within a range of from 1 degree to 11 degrees.

Of the constituent parts of the optical components shown in FIG. 1, only the outer diameter of the metal housing 10 is increased to form a sample in which the overhanging quantity ΔX is in a range of from 0 mm to 1.0 mm. In the case where spot-welding is performed by radiating a laser beam to the sample at an incident angle θ within a range of from 1 degree to 6 degrees, the decrease of light-intensity can be made not more than 0.05 dB.

In any value of the overhanging quantity ΔX, an optimum incident angle θ can be found out within a range of θ>0. Particularly, in the sample in which the maximum overhanging quantity ΔX is within a range of from 0.3 mm to 1.0 mm, the decrease of light-intensity in optical components assembled by spot-welding by radiating a laser beam at this optimum incident angle θ can be suppressed so as not to exceed 0.05 dB which is an upper allowable limit.

Figure 4B:
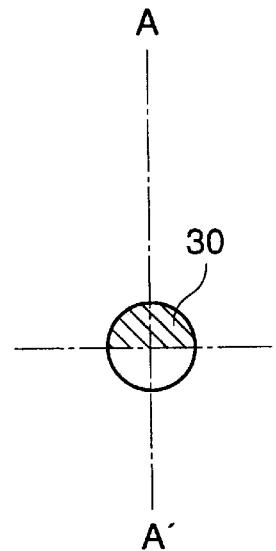
Figure 4C:
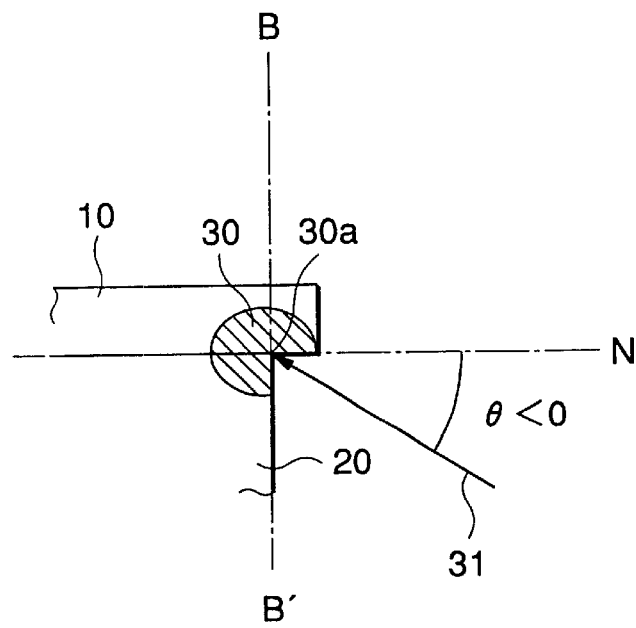

On the other hand, as shown in FIG. 4C, when the incident angle is in a range of θ≦0, that is, when a laser beam is radiated from a direction opposite to the first metal housing 10 side overhanging in the direction N perpendicular to the side of the metal housing, thermal deformation varies widely depending on each sample, and the decrease of light-intensity often exceeds 0.05 dB.

(Embodiment 2)

An Embodiment 2 is directed to allowable combinations of respective dimensions of the first and second metal housings, other than the combination of the metal housings disclosed in Embodiment 1.

Figure 2A:
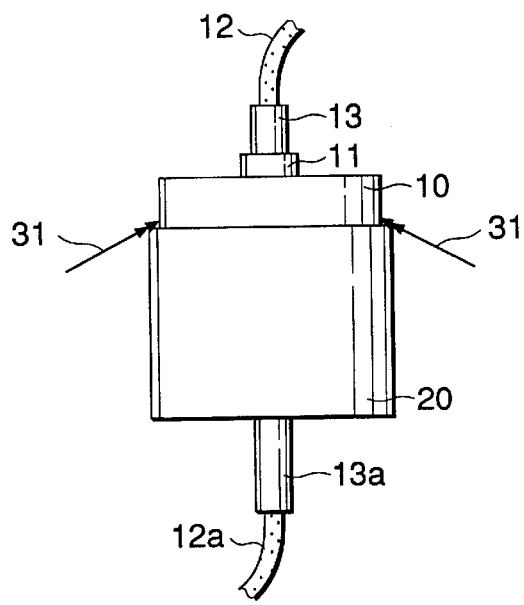
FIGS. 2A to 2C are side views illustrating combinations of metal housing having different dimensions, to which the present invention is applicable.
Figure 2B:
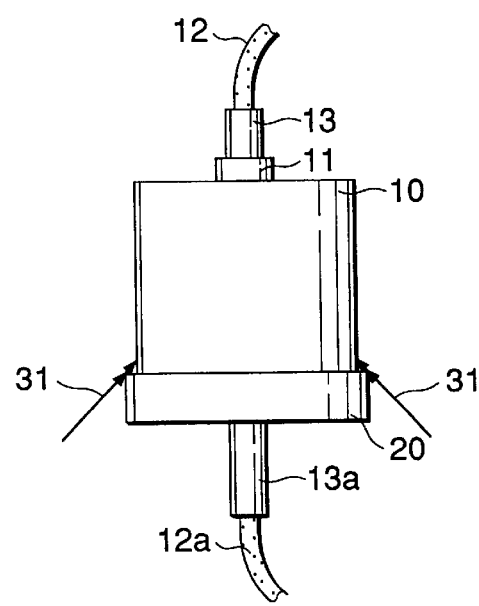
Figure 2C:
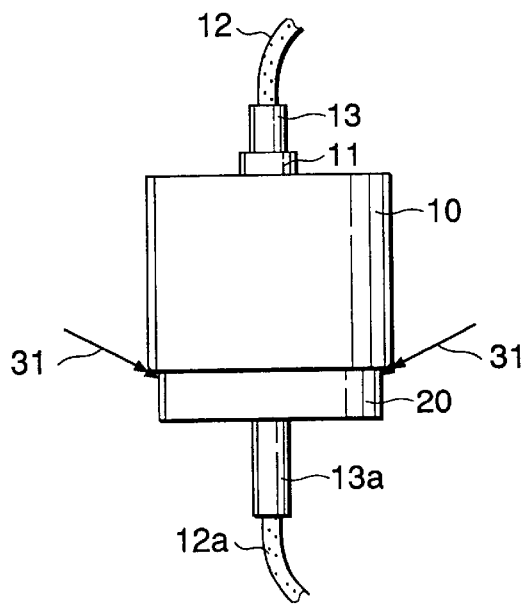
Figure 3A:
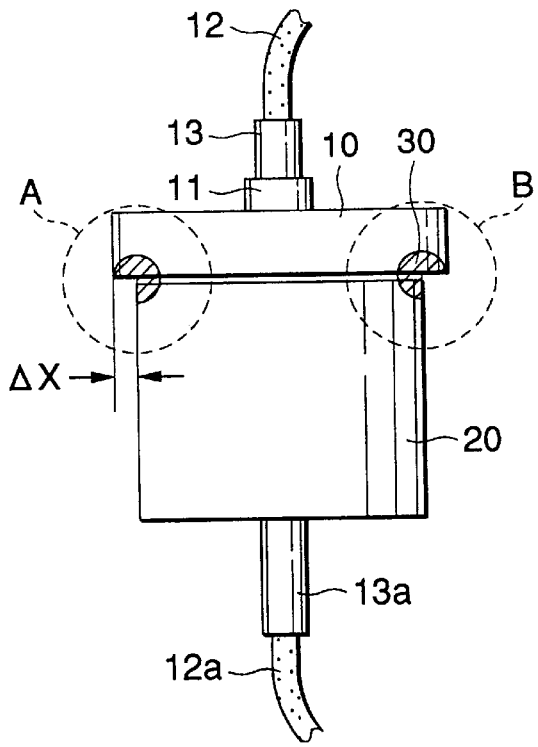
FIGS. 3A and 3B are side views illustrating a cause of thermal deformation based on welding.
Figure 3B:
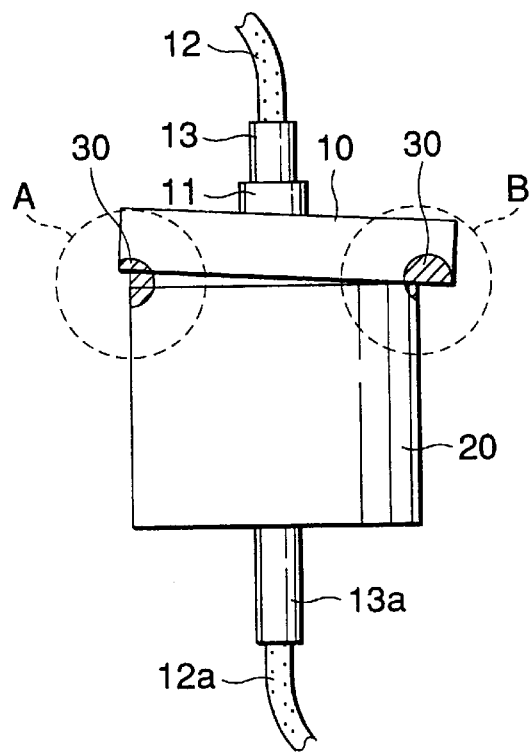

That is, in the combination of the metal housings, there are various cases: a case where the diameter and height of the first metal housing 10 are smaller than the diameter and height of the second metal housing 20 respectively as shown in FIG. 2A, a case where the diameter of the first metal housing 10 is smaller than the diameter of the second metal housing 20 while the height of the first metal housing 10 is larger than the height of the second metal housing 20 as shown in FIG. 2B, and a case where the diameter and height of the first metal housing 10 are larger than the diameter and height of the second metal housing 20 respectively as shown in FIG. 2C.

In either case, the optimum incident angle θ of the laser beam is affected by the value of the overhanging quantity ΔX. Therefore, when spot-welding is performed by radiating a laser beam after finding-out an optimum value of the incident angle θ within a range of θ>0, the decrease of light-intensity can be suppressed within an allowable range.

(Embodiment 3)

Embodiment 3 is directed to a case where the melting point of metal material forming an overhanging metal housing is made lower than the melting point of metal material forming the other metal housing to thereby further suppress thermal deformation in welding and decrease light-intensity due to the thermal deformation.

For example, it is the case where SUS303 the melting point of which is 1,400° C. is used as the metal material of the overhanging metal housing 10, while SUS304 the melting point of which is 1,450° C. is used as the metal material of the other metal housing 20.

A chief reason why the decrease of light-intensity can be further suppressed is that welding spots are formed only on the low-melting-point overhanging metal housing side so that the size of the welding spots is reduced to about a half in comparison with the case where the same metal is used for the two metal housings.

That is, as inferred easily from the above-mentioned consideration about thermal deformation of metal housings, thermal deformation is produced on the low-melting-point metal housing side, since the member is irradiated and melted in the welding positions by a laser beam and the melted portions are cooled and solidified while being subjected to tensile stress. On the other hand, on the high-melting-point metal housing side, no portion is melted even if it is irradiated with the laser beam, and therefore, even if it is once expanded, it shrinks due to cooling and returns to its original state entirely. Accordingly, it is considered that thermal deformation and the decrease of light-intensity due to the thermal deformation are also reduced to about half in comparison with the case where metal housings formed of the same metal material are used.

In addition, another reason why low-melting-point metal material is used for the overhanging metal housing is that if the melting portions are close to the skirt portion of the overhanging metal housing where heat can easily escape, the quantity of the thermal expansion in the melting portions is reduced so much, and the quantity of thermal deformation is also reduced correspondingly.

(Embodiment 4)

As for the positional relationship between the respective metal housings determined by adjusting the optical axes, the central axes are often shifted slightly, and in most cases one metal housing having a larger outer-diameter overhangs all over the circumference of the joint surface from the other metal housing.

In an extreme case, however, the metal housings overhang from each other.

In this case, a laser beam is radiated upon the respective overhanging portions from directions inclined toward the overhanging portions respectively, that is, a laser beam is radiated on the spot welding portions with an incident angle θ>0 while the incident directions per se are different with each other. In such a manner, it is possible to suppress the decrease of light-intensity to be within an allowable range.

Hereinafter, examples of the above-described embodiments will be described with reference to the accompanying drawings.

(Relationship Between an Optimum Incident Angle θ and Thermal Deformation/decrease of Light-intensity)

FIG. 1 shows a sectional view of optical components in this embodiment.

A first metal housing 10 is a columnar body of SUS304 stainless steel having an outer diameter of 4.5 mm at a collar portion, and a thickness of 0.8 mm. The first metal housing 10 has a through hole along its central axis. The through hole acts as a light path. In addition, a cylindrical optical fiber holder 11 is bonded on the upper portion of the through hole, and an optical fiber collimator 12 as a first optical element is inserted to the cylindrical optical fiber holder 11 through a protective tube 13.

A second metal housing 20 is a columnar body of SUS 304 stainless steel having an outer diameter of 4.2 mm, and a thickness of 12 mm. The second metal housing 20 holds an isolator crystal 21 in its inside as a chief element of a second element. In addition, the second metal housing 20 has a through hole along its central axis. The through hole acts as a light path. The second metal housing 20 also holds an optical fiber collimator 12a as a portion of the second optical element. The optical fiber collimator 12a is linked with the isolator crystal 21 through a protective tube 13a.

Respective joint surfaces 10b and 20b of these metal housings 10 and 20 holding the respective optical elements are made to abut against each other, so that an optimum position to minimize the decrease of light-intensity is determined by adjusting the optical axes.

In this case, the overhanging quantity ΔX was different depending on the samples, namely, the overhanging quantity ΔX was not always the same in every position on the circumferences of the surfaces of respective samples where metal housings abutted against each other.

About these samples, spot-welding with YAG laser light was performed in three welding positions 30a on the outer circumferences of the joint surfaces at an interval of 120 degrees including a position where the overhanging quantity ΔX was maximum of 0.3 mm, in 14 cases where the incident angle θ was varied successively by one degree within a range of from +10 degrees to −3 degrees.

The YAG laser beam was radiated with intensity of 10 W/mm$^2$ onto a protrusion portion 10a of a skirt portion of the metal housing 10 and a side 20a near the joint surface of the metal housing 20 at the same time so as to perform spot-welding.

The decrease of light-intensity was measured in these optical components so that the relationship between the incident angle θ and thermal deformation, that is, the decrease of light-intensity was examined.

In addition, in order to make the influence of the overhanging quantity ΔX clear, similar investigation was performed about optical components in which, of the constituent parts, the outer diameter of a collar portion of the metal housing 10 was increased to 5.2 mm, but the other portions were the same as those in the above-mentioned case, and the overhanging quantity ΔX of the outer circumferences of the joint surfaces where the metal housings abut against each other was made within a range of from 0 mm to 1.0 mm.

As a result, an optimum position of the incident angle θ of a laser beam where the decrease of light-intensity is minimized exists within a range of the incident angle θ>0, in either case where the maximum of the overhanging quantity ΔX is 0.3 mm or 1.0 mm, as shown in FIG. 5.

In addition, to prevent the decrease of light-intensity from exceeding 0.05 dB which is an allowable limit, it is understood that it will do to make the incident angle be within a range of from 0 degree<θ<6 degrees in the former, and make the incident angle be within a range of 0 degree<θ<11 degrees in the latter.

Generally, the larger the overhanging quantity ΔX, the smaller the optimum incident angle θ. On the contrary, the smaller the overhanging quantity ΔX, the larger the optimum incident angle θ.

Therefore, from this result, in the case where optical components are assembled actually, optical components in which the decrease of light-intensity is extremely small and the optical characteristic is superior can be assembled if the relationship between the optimum incident angle θ and the overhanging quantity ΔX can be found out within a range of incident angle of θ>0 with respect to the metal housings of the optical components.

Particularly, with respect to optical components with ordinary dimensions, it can be considered from the result of FIG. 5, that the optimum incident angle θ therefor is generally within a range of 0 degree<θ<11 degrees. Accordingly, the range to be investigated is so narrow that the optimum incident angle θ for metal housings having various dimensions can be found out comparatively easily.

In this embodiment, in order to show a result obviously, only samples of optical components having the same maximum overhanging quantity ΔX were selected and the relationship between the incident angle θ and the decrease of light-intensity was examined. However, practically, even in the metal housings having the same dimensions, the overhanging quantity ΔX between the metal housings after adjustment of the optical axes may be varied among samples.

An optimum incident angle θ can be determined for such a group of optical components having a fixed distribution of the overhanging quantity ΔX among samples, and the decrease of light-intensity can be reduced so as not to exceed a predetermined value.

Although a range where the decrease of light-intensity does not exceed 0.05 dB which is an allowable limit also exists within a range of the incident angle of θ<0 according to FIG. 5, dispersion of the decrease of light-intensity among samples becomes large in this range. Therefore, FIG. 5 shows the decrease of light-intensity by an average value of 10 data. Accordingly, in spite of the same value in the axis of ordinate, the proportion defective becomes high in comparison with the range of the incident angle of θ>0.

(Reason Why an Optimum Incident Angle θ Exists)

The reason why an optimum value which minimizes the decrease of light-intensity exists within a range of the incident angle of θ>0 is that heating, temperature rising due to the heating and thermal deformation becomes uniform more easily when the members 10a and 20a near the welding positions 30a on the bottom of a V-shaped recess portion of a skirt portion of the overhanging metal housing are irradiated and heated by a laser beam at the same time than when the welding positions 30a are irradiated directly with the laser beam.

On the other hand, the reason why light-intensity decreases when the incident angle is within a range of θ<0 is that the welding positions 30a are on the bottom of the V-shaped recess portion of the skirt portion of the overhanging metal housing, and the ratio of the outside surface area per unit volume of the metal member in the welding positions is so small that heat is difficult to escape.

Therefore, when a laser beam is radiated to this portion directly from a direction at the incident angle of θ≦0, the temperature rises suddenly, and thermal deformation is caused by the temperature rising. As a result, thermal conditions are apt to scatter in welding positions, so that thermal deformation is apt to be ununiform.

In the range of the incident angle of θ>0, the larger the incident angle θ is made in comparison with the optimum incident angle, the more light-intensity decreases. This is because if the incident angle θ increases too much, the laser beam 31 is radiated on the side 20a of the second metal housing at a position considerably far away from the welding position 30a, so that comparatively plenty of calorie is supplied before the metal of the welding position 30a is melted and the quantity of thermal deformation is therefore increased.

Even in the case where the laser beam 31 is radiated on a position a little away from the welding position, the metal portion of the welding positions 30a is melted. This is because even in the case of the same metal housing material, the melting point becomes low in a protrusive portion, and the smaller the radius of curvature of the protrusive portion, the lower the melting point.

(Relationship Between the Incident Angle θ and the Shape of a Welding Spot)

FIGS. 4A to 4D show a relationship between the incident angle θ of a laser beam and the sectional shape of a welding spot.

About the sectional shape of a welding spot when a laser beam is radiated at an incident angle of θ>0, FIG. 4A shows a longitudinal sectional view including a welding position 30a which is the center of a welding spot 30, and FIG. 4B shows a sectional view taken on line A–A', including the welding position 30a and the side of the second metal housing 20.

In this case, the temperature distribution around the welding position 30a becomes comparatively uniform, so that the shape of the welding spot 30 becomes circular.

Figure 4D:
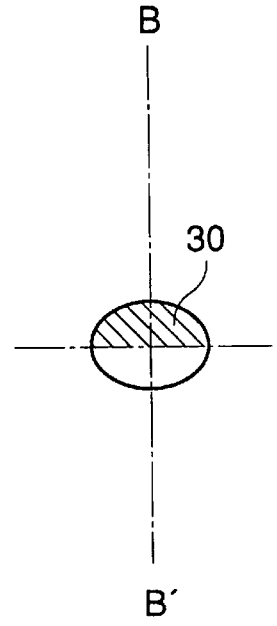
Figure 6:
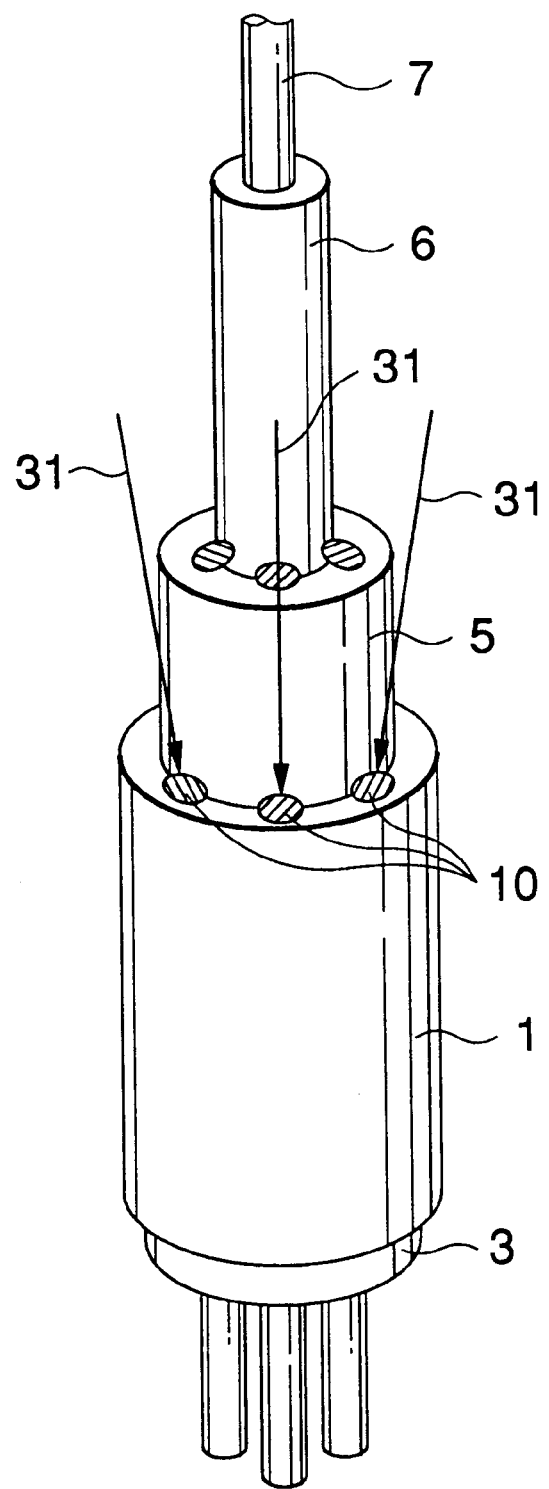
FIG. 6 is a perspective view illustrating conventional optical components and welding positions of the optical components.

About the sectional shape of a welding spot when a laser beam is radiated at an incident angle of θ<0, FIG. 4C shows a longitudinal sectional view including a welding position 30a, and FIG. 4D shows a sectional view taken on line B–B', including the welding position 30a and the side of the second metal housing 20.

In the range of the incident angle of θ<0, heat is not supplied by a laser beam to the overhanging portion on the skirt of the metal housing 10, and heat is apt to escape from this portion. Accordingly, the shape of the welding spot 30 becomes an elliptic on the metal housing 10 side, and while circular on the metal housing 20 side.

(Others, Shapes of Metal Housings and Spot Welding)

Although the above embodiments and examples have been described about the case where columnar metal housings are used, the present invention is not limited to this case, but is applicable to the case where metal housings having other shapes are used.

In addition, although the above embodiments and examples have been described about the case where spot welding is performed by using a laser beam, the present invention is not limited to this case, but is applicable to other cases where spot welding based on other heating systems is adopted.

As was described above, according to the present invention, when optical components constituted by metal housings holding very small optical elements are to be assembled even in the case where the respective central axes of the metal housings do not coincide with each other so that one the metal housings overhangs from the other one with respect to a mutual positional relationship determined by the optical axes adjustment, a laser beam is radiated from the overhanging metal housing side so as to perform spot welding. Consequently, thermal deformation causing rotations of the optical axes of the held optical elements can be reduced conspicuously, so that the decrease of light-intensity when the optical components are assembled can be suppressed to an extremely low level.

In addition, in the optimum mutual position between the metal housings determined by the optical axes adjustment of the central axes often become incoincident. Therefore, the present invention is effective in the case of mass-production of optical components, and has great practical significance.

What is claimed is:

1. An optical component assembling method, in which a first metal housing holding a first optical element and a second metal housing holding a second optical element are made to abut against each other on joint surfaces thereof, and irradiated with a laser beam so as to be welded with each other, said method comprising the steps of:

allowing a side of one of said metal housings to overhang from a side of the other of said metal housings; and radiating said laser beam in an incident direction inclined to said overhanging metal housing side so as to perform spot-welding on outer circumferences of said joint surfaces where said metal housings abut against each other.

2. An optical component assembling method according to claim 1, wherein said first optical element is an optical fiber.

3. An optical component assembling method according to claim 1, wherein an incident angle of said laser beam is in a range of from 1 degree to 11 degrees.

4. An optical component assembling method according to claim 1, wherein said laser beam is a YAG laser beam.

5. An optical component assembling method according to claim 1, wherein the melting point of metal forming said second metal housing is higher than the melting point of metal forming said first metal housing.

6. Optical components assembled by an optical component assembling method according to any one of claims 1 to 5.

* * * * *